(12) United States Patent
Retana et al.

(10) Patent No.: US 7,978,612 B2
(45) Date of Patent: Jul. 12, 2011

(54) TWO-HOP RELAY FOR REDUCING DISTANCE VECTOR ROUTING INFORMATION

(75) Inventors: Alvaro Retana, Raleigh, NC (US);
Stanley Ratliff, Raleigh, NC (US);
Donnie Van Savage, Raleigh, NC (US);
Mihail L. Sichitiu, Cary, NC (US);
Russell White, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 66 days.

(21) Appl. No.: 12/250,446

(22) Filed: Oct. 13, 2008

(65) Prior Publication Data
US 2010/0091823 A1 Apr. 15, 2010

(51) Int. Cl.
*H04L 12/26* (2006.01)
*H04L 12/56* (2006.01)
*G06F 15/173* (2006.01)

(52) U.S. Cl. .................. 370/238; 370/254; 709/242
(58) Field of Classification Search .................. None
See application file for complete search history.

(56) References Cited

U.S. PATENT DOCUMENTS

| | | | |
|---|---|---|---|
| 6,032,194 A * | 2/2000 | Gai et al. ...................... | 709/239 |
| 6,484,209 B1 * | 11/2002 | Momirov ...................... | 709/238 |
| 6,578,086 B1 * | 6/2003 | Regan et al. ................... | 709/242 |
| 6,836,463 B2 * | 12/2004 | Garcia-Luna-Aceves et al. ........................ | 370/238 |
| 7,023,808 B2 | 4/2006 | Ball et al. | |
| 7,042,834 B1 | 5/2006 | Savage | |
| 7,123,620 B1 | 10/2006 | Ma | |
| 7,174,371 B2 * | 2/2007 | Elo et al. ...................... | 709/220 |
| 7,203,191 B2 | 4/2007 | Garcia-Luna-Aceves et al. | |
| 7,230,914 B2 | 6/2007 | Sankar et al. | |
| 7,260,518 B2 | 8/2007 | Kerr et al. | |
| 7,298,707 B2 * | 11/2007 | Retana et al. ................. | 370/252 |
| 7,302,482 B2 | 11/2007 | Rodosek et al. | |
| 7,319,674 B2 | 1/2008 | Chandra et al. | |
| 7,325,069 B1 | 1/2008 | Gage et al. | |
| 7,333,501 B2 | 2/2008 | Cook et al. | |
| 7,450,495 B2 | 11/2008 | Guerin et al. | |
| 7,466,703 B1 | 12/2008 | Arunachalam et al. | |
| 7,512,106 B2 * | 3/2009 | Van Tran et al. .............. | 370/338 |

(Continued)

OTHER PUBLICATIONS

Chandra, M and Roy, A, Extensions to OSPF to Support Mobile Ad Hoc Networking, draft-chandra-ospf-manet-ext-05, Aug. 1, 2007, p. 32pp, Publisher: http://tools.ietf.org/html/, Published in: San Jose, California, US.

(Continued)

*Primary Examiner* — Gregory B Sefcheck
(74) *Attorney, Agent, or Firm* — Patent Capital Group (57) ABSTRACT

In one embodiment, a method for using a two-hop relay includes receiving an update message for a distance vector routing protocol from a first neighbor. The update message is sent to a different neighbor. Often, it is first determined whether the receiving node is a relay node for the first neighbor in the protocol. The relay node is a node preferred to update a particular node two hops from the first neighbor. In another embodiment, a method for serving as the two-hop relay includes receiving from each neighbor a first message that includes neighbor data that indicates nodes that are in direct communication with the neighbor. A relay set of fewer than all neighbors is determined. Every node two hops from the first node is updated using only the relay set of neighbors. The relay set is sent in a second message for the protocol.

22 Claims, 5 Drawing Sheets

U.S. PATENT DOCUMENTS

| | | | |
|---|---|---|---|
| 7,525,920 B2* | 4/2009 | Guerin et al. | 370/238 |
| 7,672,253 B2* | 3/2010 | Yang et al. | 370/255 |
| 7,693,073 B2 | 4/2010 | Soja-Molloy et al. | |
| 7,693,939 B2* | 4/2010 | Wu et al. | 709/203 |
| 7,697,505 B2* | 4/2010 | White et al. | 370/351 |
| 7,808,927 B2* | 10/2010 | Retana et al. | 370/254 |
| 7,821,956 B2* | 10/2010 | Retana et al. | 370/252 |
| 2003/0107992 A1* | 6/2003 | Garcia-Luna-Aceves et al. | 370/230 |
| 2004/0213167 A1* | 10/2004 | Garcia-Luna-Aceves et al. | 370/254 |
| 2005/0073998 A1* | 4/2005 | Zhu et al. | 370/352 |
| 2005/0135256 A1 | 6/2005 | Ball et al. | |
| 2005/0160179 A1* | 7/2005 | Retana et al. | 709/238 |
| 2006/0007865 A1* | 1/2006 | White et al. | 370/238 |
| 2006/0282511 A1 | 12/2006 | Takano et al. | |
| 2006/0291404 A1* | 12/2006 | Thubert et al. | 370/254 |
| 2007/0019647 A1* | 1/2007 | Roy et al. | 370/392 |
| 2007/0115837 A1* | 5/2007 | Elie-Dit-Cosaque et al. | 370/242 |
| 2007/0121521 A1* | 5/2007 | D'Amico et al. | 370/252 |
| 2007/0237095 A1 | 10/2007 | Yang et al. | |
| 2007/0291663 A1* | 12/2007 | Dixit et al. | 370/254 |
| 2008/0031236 A1 | 2/2008 | Yang et al. | |
| 2008/0043635 A1* | 2/2008 | Retana et al. | 370/252 |
| 2009/0091465 A1 | 4/2009 | Buckingham et al. | |
| 2009/0147723 A1* | 6/2009 | Fang et al. | 370/315 |
| 2009/0238076 A1* | 9/2009 | Retana et al. | 370/238 |
| 2010/0309799 A1* | 12/2010 | Nunzi et al. | 370/252 |

OTHER PUBLICATIONS

Perkins et al., Ad Hoc On-Demand Distance Vector (AODV) Routing, Jul. 2003, p. 14 (30 pages).

* cited by examiner

FIG. 4A
400 METHOD FOR USING RELAY NEIGHBORS

FIG. 4B

TWO-HOP RELAY FOR REDUCING DISTANCE VECTOR ROUTING INFORMATION

BACKGROUND OF THE INVENTION

1. Technical Field

The present invention relates to distance vector routing in packet switching communication networks, such as in a wireless mobile ad hoc network (MANET).

2. Background

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links.

Routers are intermediate network nodes that support the exchange of data packets across multiple heterogeneous subnetworks. Routing protocols are used by routers to pass information that affects the links chosen by each router to forward a data packet. Some routing protocols require routers to exchange information about all connections at each router. Distance vector routing protocols require a router to pass only summary information that indicates a destination in the network and a total cost (called a distance) of reaching that destination from the router.

In emerging mobile networks, such as mobile ad hoc networks, communication bandwidth between routers can be scarce, while routing information is likely to change quickly, at least some of the time, as mobile nodes move into and out of direct communication with each other. Depending on the radio characteristics of the communicating nodes, some communication is two way (each can send and receive to the other) and some is one way (e.g., the node with a weaker transmitter can only receive from the other node and not send to it). It is very uncommon to use a one-way link for routing.

On demand routing protocols conserve bandwidth by passing routing information only when needed to forward a particular data stream of one or more packets of data. Such routing protocols may be perceived as slow to establish a connection. Proactive routing protocols use the time between data packets to pass routing information changes so that each router already has a path to each destination in the network. Such protocols may be perceived as faster to establish a connection, but may consume extra bandwidth for route maintenance, which slows the perceived duration of transmitting a data stream.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

A method and apparatus are described for reducing routing information passed in a distance vector routing protocol by using a two-hop relay. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments are described below in the context of a small network of reasonably stable wireless two-way communication links using a particular distance vector protocol, such as the Enhanced Interior Gateway Routing Protocol (EIGRP) of Cisco Systems, Inc. of San Jose, Calif. However, embodiments of the invention are not limited to this context. In other embodiments, larger networks with wired or wireless communication links that are equally or less stable than those depicted herein, using the same or different distance vector routing protocols are involved in addition to or instead of the nodes, links and protocols described herein.

1.0 Overview

In one set of embodiments, a method for using a two-hop relay includes receiving an update message for a distance vector routing protocol at a node in a communications network from a first neighbor node in direct communication with the node. An update message is a message that indicates a destination in the communications network and a least total cost of reaching that destination from the neighbor that sent it. The receiving node sends the update message to a different neighbor of the plurality of neighbors, even though the routing protocol is a distance vector routing protocol that normally does not forward update messages.

In some of these embodiments, it is first determined whether the node is a relay node for the first neighbor in the distance vector routing protocol. If so, then the update message is sent immediately to the different neighbor. The relay node is a node preferred by the first neighbor to update a particular one or more nodes two hops from the first neighbor.

In another set of embodiments, a method for serving as a two hop relay includes receiving, at a first node in a communications network, a first message for a distance vector routing protocol from each neighbor. The first message from each neighbor includes neighbor data that indicates a set of one or more nodes that are in direct communication with the neighbor. A relay set of fewer than all neighbors is determined based on the neighbor data received from every neighbor. Each neighbor in the relay set is a neighbor preferred to update a particular one or more nodes two hops from the first node, and every node two hops from the first node is updated using only the relay set of neighbors. A second message for the distance vector routing protocol is sent to all the neighbors. The second message includes relay data that indicates the relay set.

In other embodiments, an apparatus, or logic encoded in one or more tangible media, or instructions encoded on one or more computer-readable media are configured to perform one or more steps of the above method.

As used herein, the article "a" and "the" mean "one or more," unless otherwise indicated; and "comprising" and "including" before one or more listed items means "including but not limited to" the one or more listed items.

2.0 Networks

Figure 1:
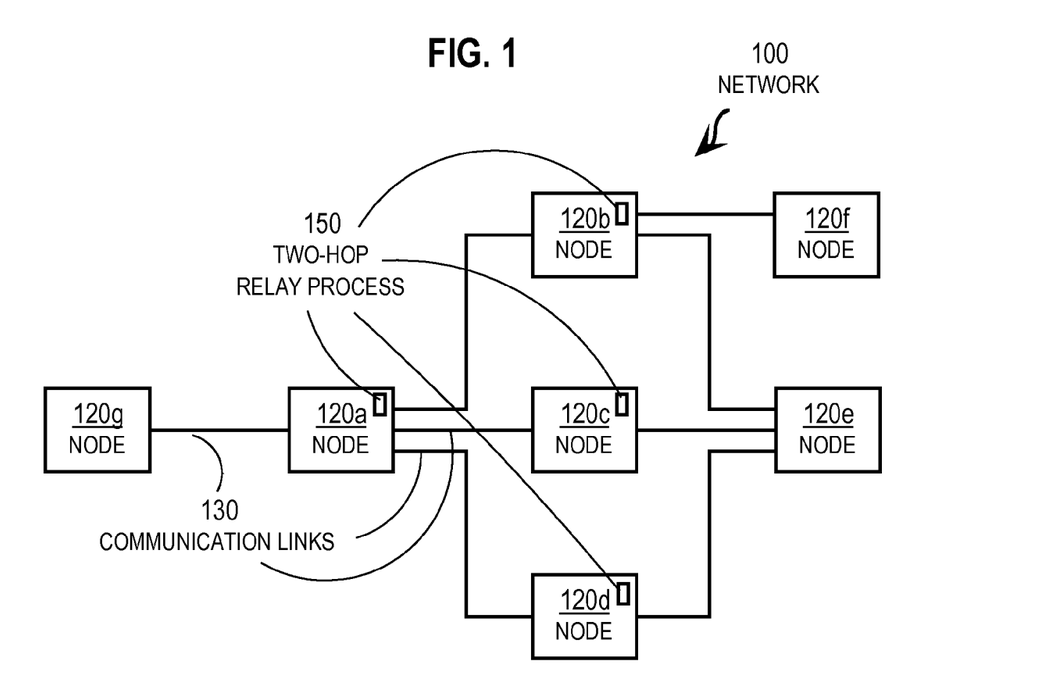
FIG. 1 illustrates an example network that incorporates a two-hop relay process for a distance vector routing protocol, according to an embodiment.

FIG. 1 illustrates an example network 100 that incorporates a two-hop relay process for a distance vector routing protocol, according to an embodiment. The network includes intermediate network nodes 120, including node 120a, node 120b, node 120c, node 120d, node 120e, node 120f and node 120g connected by communication links 130. For purposes of illustration, each of links 130 represents two-way wireless communications using a single carrier frequency. In other embodiments, one or more links 130 are wireless links using one or more different carrier frequencies or are wired or optical cable links.

In a conventional distance vector routing protocol, each node 120 learns of its neighbors by receiving routing protocol neighbor discovery messages, such as an EIGRP HELLO message, that indicates a node identifier for the node that sent the message. As used herein, a neighbor of a node is a node with which that node has a direct two-way communication. In the illustrated embodiment, the direct communication links 130 are two-way links. Based on the HELLO and an acknowledgement message exchanged between each neighbor, each node 120 determines a cost associated with the link between the node and its neighbor. Any method known in the art may be used to determine a cost metric value for a link.

Each node then sends out a distance vector routing protocol update message that indicates a list of network addresses that can be reached from the node and the cost of reaching that address from the node sending the update message. At the start, each node 120 only knows the addresses and costs of any local area networks (LANs, not shown) connected directly to the node and its own address (with a cost of zero). Each node that receives an update message uses the information to update its routing information and sends an acknowledgement message. The receiving node then determines whether the new information changes the information it has previously sent out about the network addresses it can reach and the costs. If so, the receiving node adds the cost of the link between itself and the sending node to the cost of the addresses and sends a new update message with the changed information to its neighbors. The receiving node never forwards the update message from the sending node unchanged.

If possible, the revised update message is not sent back to the sending node, in an application of a so-called split horizon rule, to prevent extraneous looping of routing protocol packets back and forth between the two nodes. In wireless communications received by all neighbors, the update may be unicast or multicast only to the other neighbors; rather than broadcast to all neighbors. In a unicast, the address of a particular intended recipient is included in an internetwork layer protocol. In a multicast, the group name for a set of nodes is included in the internetwork layer protocol. The protocol update messages can be rather lengthy compared to the protocol neighbor discovery messages.

Some nodes are configured with filters to avoid forwarding data packets for some addresses, called filtered nodes. Filter data indicates a filtered node in the communications network for which data packets are not forwarded by the node. In such nodes, a change to the reachability or cost of a filtered node address is not included in an update message sent by the node. For example, if abusive behavior is noted from a particular LAN (not shown) attached to node 120g by a network administrator for a LAN connected to node 120b, node 120b may be configured with a filter to remove routing information for the abusive LAN. If a cost on the link from node 120g to node 120a changes, prompting node 120a to send an update message to all its neighbors, and only the abusive LAN is connected to node 120g, then node 120b will not send an update message with the new cost in response to this update received from node 120a.

Eventually the routers in the network converge on a set of addresses reachable at itself and each neighbor, and the associated costs.

There are circumstances in which this update process is wasteful of bandwidth that may be scarce in a mobile network, such as a MANET. Consider an update sent by node 120a to its neighbors, for example because node 120g enters or leaves the network 100, or a new LAN is connected to node 120a. The update message sent by node 120a is received and acknowledged by all the neighbors of node 120a, including node 120b, node 120c and node 120d. This information is incorporated into the routing information at each of these nodes. Then updates are sent by node 120b, node 120c and node 120d to node 120e, while the update from node 120b is also heard at node 120f. The updates sent by node 120b, node 120c and node 120d all indicate that node 120g and its LANs are now reachable (unreachable) on the communications links 130 with node 120b, node 120c and node 120d. This information is redundant. Therefore the bandwidth consumed to transmit all three updates is largely wasted. The only difference among the three updates might be any difference in costs of reaching node 120g and its LANs among node 120b, node 120c and node 120d. However, if the node 120g has left the network 100, there is not even a cost difference among the updates from the three nodes: node 120b, node 120c and node 120d; and the bandwidth consume by two of the three messages is entirely wasted.

Applicants have developed techniques to provide node 120e with the routing information it needs, without sending three updates, one each from node 120b, node 120c and node 120d. This can have significant impact on the availability of scarce bandwidth, because the update messages are rather lengthy compared to the other routing protocol messages, like a neighbor discovery message. In general, the techniques of the illustrated embodiments save scarce bandwidth in any network that includes one or more nodes that are two hops or more away from a node that experiences a change in routing information (such as reachability data).

According to the illustrated embodiment, at least some nodes 120 include at least a portion of a two-hop relay process 150. For example, node 120a, node 120b, node 120c and node 120d include two-hop relay process 150, or a portion thereof. In other embodiments, every intermediate node in a network 100, or a wireless portion thereof, includes the two-hop relay process 150.

While a certain number of nodes 120 and links 130 are depicted in network 100 for purposes of illustration, in other embodiments, a network includes more nodes, such as routers, more links, with the same or different costs and more or fewer end nodes and LANs.

3.0 Data Structures

Figure 2:
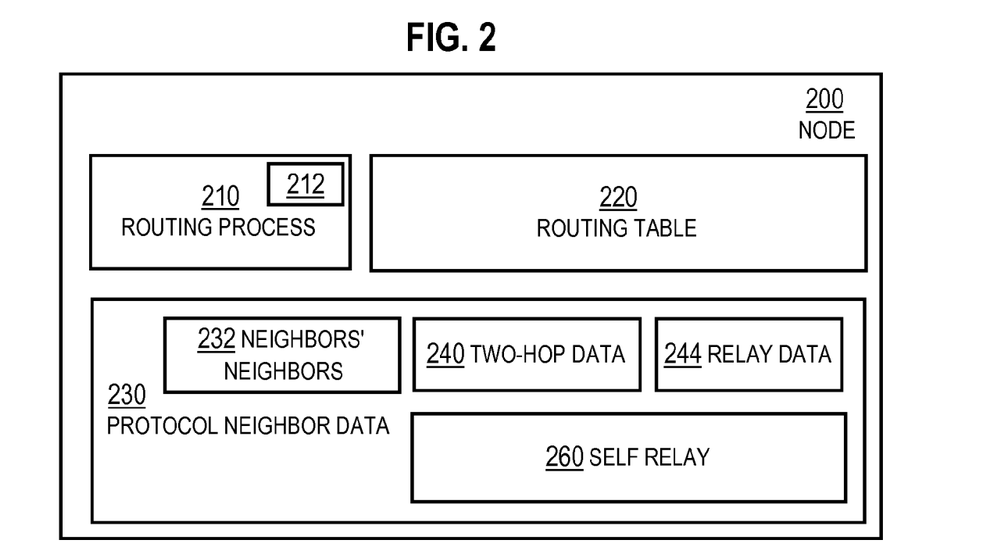
FIG. 2 illustrates example data structures on a router, according to an embodiment.

FIG. 2 illustrates example data structures on a node 200, such as a router, according to an embodiment. Node 200 includes a routing process 210, a routing table 220, and routing protocol information in the form of protocol neighbor data 230.

The routing process 210 executes on a processor, such as a general purpose processor executing sequences of instructions that cause the processor to perform the routing process. According to illustrated embodiments of the invention, routing process 210 includes one or more methods 212 of the two-hop relay process 150. These methods are described in more detail below with respect to FIG. 4A and FIG. 4B. The routing process 210 stores and retrieves information in the routing table 220 based on information received in one or more distance vector routing protocol messages that are stored in a neighbor data structure 230 of a routing protocol information data structure.

The routing table 220 is a data structure that indicates for each destination that can be reached from the router 200, an address, a link and zero or more attributes, as is well known in the art.

The routing protocol neighbor data structure 230 is a data structure that includes, for each neighbor, a list of reachable destinations and costs, as is well known in the art. According to the illustrated embodiments, the neighbor data also includes a neighbors' neighbors field 232, a two-hop data field 240, a relay data field 244, and self relay field 260.

The neighbor's neighbors field 232 holds data that indicates all the neighbors of a neighbor of node 200, as listed in neighbor discovery messages, described below. In some embodiments, the neighbors' neighbors field 232 includes multiple entries for the same node, including multiple entries for the node 200 itself. For example, the neighbors of node 120a are, in alphabetical order, node 120b, node 120c, 130d and node 120g. If all those nodes send their neighbors list to node 120a and node 120a stores those lists in neighbors' neighbors field 232, then field 232 includes the list of node 120a, node 120e, node 120f, node 120a, node 120e, node 120a, node 120e, node 120a.

The two-hop data field 240 is a pared down list of all the nodes that are two-hops from the node 200, based on data in the neighbors' neighbors field 232, but with redundant entries and all entries for the node 200, itself, removed. For example, at node 120a, the two hop data field 240 includes the list of node 120e and node 120f, which are the only nodes in network 100 that are two hops from node 120a, and a complete list.

The relay data field 244 holds data that indicates a subset of the neighbors of node 200 that are sufficient to forward updates to all nodes that are two hops away from node 200 and favored over other subsets that also reach all nodes two hops away from node 200. This subset is called the relay set of neighbors. Sometimes the subset includes all the neighbors of node 200; but advantages accrue, such as bandwidth savings, if fewer than all neighbors suffice to reach all two hop nodes. Each relay node in the relay set is a node preferred by the node 200 to update a particular node two hops from the node 200. The determination of the relay set is described in more detail in a later section. In one illustrated embodiment, the relay node is node 120b. Node 120b is able to forward all update messages from node 120a to every node two hops away from node 120a, e.g., node 120e and node 120f.

The self relay field 260 holds data that indicates any neighbors for which node 200 serves as the relay node to forward updates. For example, node 120a is the relay node for node 120b, node 120c and node 120d to forward updates to node 120g, and is the relay node for node 120g to forward updates to node 120b, node 120c and node 120f, so all four neighbors of node 120a are indicated in the self relay field 260.

Data structures may be formed in any method known in the art, including using portions of volatile memory, or non-volatile storage on one or more nodes, in one or more files or in one or more databases accessed through a database server, or some combination. Although data structures 220, 230 are shown as integral blocks with contiguous fields, e.g. fields 232, 240, 244, 260 in a particular order for purposes of illustration, in other embodiments one or more portions of fields and data structures 220, 230 are stored in the same or different order as separate data structures on the same or different multiple nodes that perform the functions of node 200. For example, in some embodiments, relay data field 244 and self relay field 260 are simply one-bit flags added to a record for each neighbor in the distance vector routing protocol neighbor data structure 230. One value of the bit in the relay data flag indicates the neighbor is a relay node for the node 200; and the other value indicates it is not. Similarly, one value of the bit in the self relay flag indicates the node 200 is a relay node for that neighbor; and the other value indicates it is not. As another example, in some embodiments, the neighbors' neighbors field 232 is a set of linked lists, each list starting in a record for one neighbor of node 200, to list the neighbors of that one neighbor.

Figure 3A:
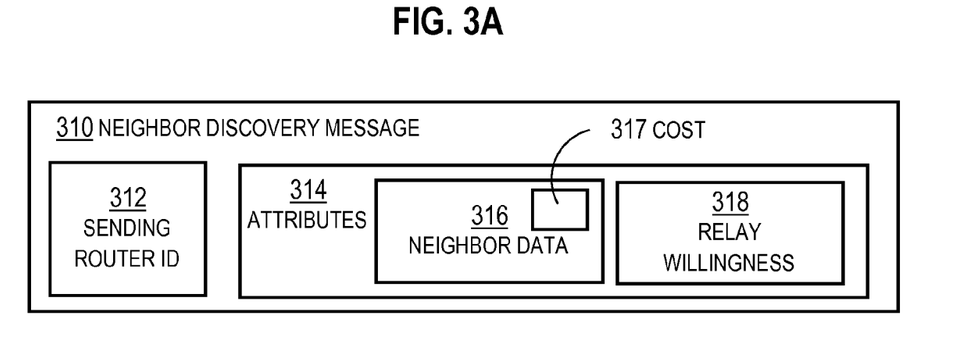
FIG. 3A illustrates an example distance vector routing protocol neighbor discovery message, according to an embodiment.

FIG. 3A illustrates an example distance vector routing protocol neighbor discovery message, 310 according to an embodiment. A neighbor discovery message is a message type used by a distance vector routing protocol to discover the nodes that have a direct communication, such as direct two-way radio communications, with a particular node. For example, in EIGRP, the neighbor discovery message is called a HELLO message.

The neighbor discovery message 310 usually includes a sending router identification (ID) field 312 and an attributes field 314, both well known in the art. The sending router ID field holds data, such as a router's loopback Internet Protocol (IP) address that uniquely indicates the node that sent the message, or a network interface card IP address that uniquely indicates a particular interface on the sending node through which the message was sent. The attributes field 314 holds data that indicates other properties of the sending node that are used by the distance vector routing protocol.

According to the illustrated embodiment, the distance vector routing protocol is extended to allow the attributes field 314 of a neighbor discovery message 310 to include a neighbor data field 316 and a relay willingness field 318.

The neighbor data field 316 indicates the router IDs for all the nodes that are neighbors of the sending node. This information is used to fill a portion of the neighbors' neighbors field 232 at the receiving node. Such information is not passed among nodes in any current distance vector routing protocol known to the inventors.

In the illustrated embodiment, the neighbor data field 316 includes cost field 317 that indicates the cost of reaching each of the neighbors of the sending node from the sending node. In some embodiments, the cost field 317 is omitted. This cost data is considered in some embodiments to decide which neighbors of the receiving node are better situated to serve as a two-hop relay node, as explained in greater detail below. In some embodiments, this cost data is used to replace information that would be sent in an update message, that can be eliminated using the two-hop relay process 150.

The relay willingness field 318 holds data that indicates the sending node's assessment of its willingness to serve as a two-hop relay node for update messages. Willingness data, such as in field 318, indicates a relative capacity of the node to serve as a relay node. Any method of determining and indicating willingness may be used. In some embodiments, the relay willingness field holds a single octet (eight bits) that varies in value from 0 to 255. By default, a node's willingness is assumed to be a middle value 128. A node that is more capable and willing, such as a node with better than average processing capacity or more powerful transmitters, with better than average two-way communications, or less than average load, might specify a larger value. A node of limited communications, transmitter power or processing capacity or heavily loaded might specify a lower value. In some embodiments the relay willingness field 318 is omitted and all nodes are assumed to have the same, default willingness.

In other embodiments, the neighbor data field 316 or the relay willingness field 318, or both, are included in other types of messages for the distance vector protocol, such as an update message that is not forwarded.

Figure 3B:
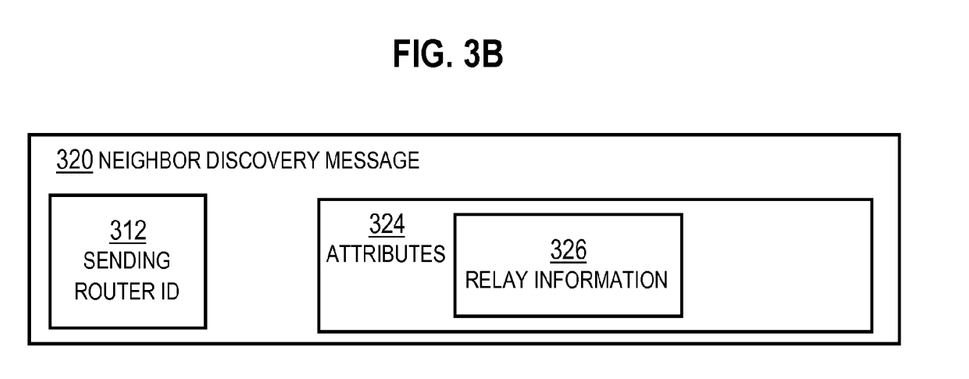
FIG. 3B illustrates another example distance vector routing protocol neighbor discovery message, according to an embodiment.

FIG. 3B illustrates another example distance vector routing protocol neighbor discovery message 320, according to an embodiment. As described above, the neighbor discovery message usually includes a sending router identification (ID) field 312 and an attributes field 324, both well known in the art.

According to the illustrated embodiment, the distance vector routing protocol is extended to allow the attributes field 324 of a neighbor discovery message 320 to include a relay information field 326. The relay information field 326 holds data that indicates a relay set of one or more neighbors of the sending node (indicated in sending node ID field 312) that are to serve as two-hop relay nodes for forwarding update messages from the sending node. For example, a neighbor discovery message from node 120a, after node 120a determines that node 120b is the appropriate two-hop relay, includes in field 326 data that indicates a relay set that consists of node 120b alone.

In other embodiments, the relay information field 326 is included in other types of messages for the distance vector protocol, such as an update message that is not forwarded, or the neighbor discovery message 310 that includes neighbor data field 316.

Figure 3C:
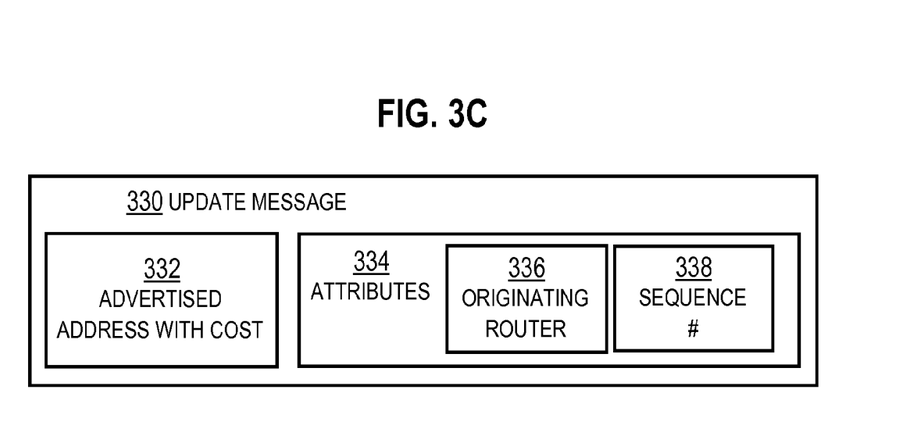
FIG. 3C illustrates an example distance vector routing protocol update message, according to an embodiment.

FIG. 3C illustrates an example distance vector routing protocol update message 330, according to an embodiment. A distance vector routing protocol update message indicates a destination in the communications network and a least total cost of reaching that destination from the node sending the message.

The distance vector routing protocol message usually includes an advertised address with cost field 332 and attributes field 334. The advertised address with cost field 332 holds data that indicates a set of addresses reachable from the sending node and the associated costs of reaching those addresses through the sending node. The attributes field 334 holds data that indicates other properties of the sending node that are used by the distance vector routing protocol.

According to the illustrated embodiment, the distance vector routing protocol is extended to allow the attributes field 334 of an update message 330 to include an originating router field 336 and a sequence number (#) field 338. The originating router field 336 holds data that indicates a node that originated the update message 330, such as a loopback IP address for the node. The sequence # field 338 holds data that distinguishes among multiple update messages sent by the same sending node for acknowledgement purposes.

Update messages in existing distance vector routing protocols are not forwarded, and do not require both an origination router field 336 and a sequence # field 338. Because the distance vector routing protocol is being extend to support two-hop relay processes, it is desirable for an update message to indicate the originating router to distinguish forwarded messages from a relay node and the update messages that originate at the relay node, as described in more detail below.

Although fields in distance vector routing protocol messages 310, 320 and 330 are shown as contiguous blocks of data in a particular order in a single data packet for purposes of illustration, in other embodiments, one or more fields or portions thereof are arranged in a different order in one or more separate data packets.

4.0 Method

Figure 4A:
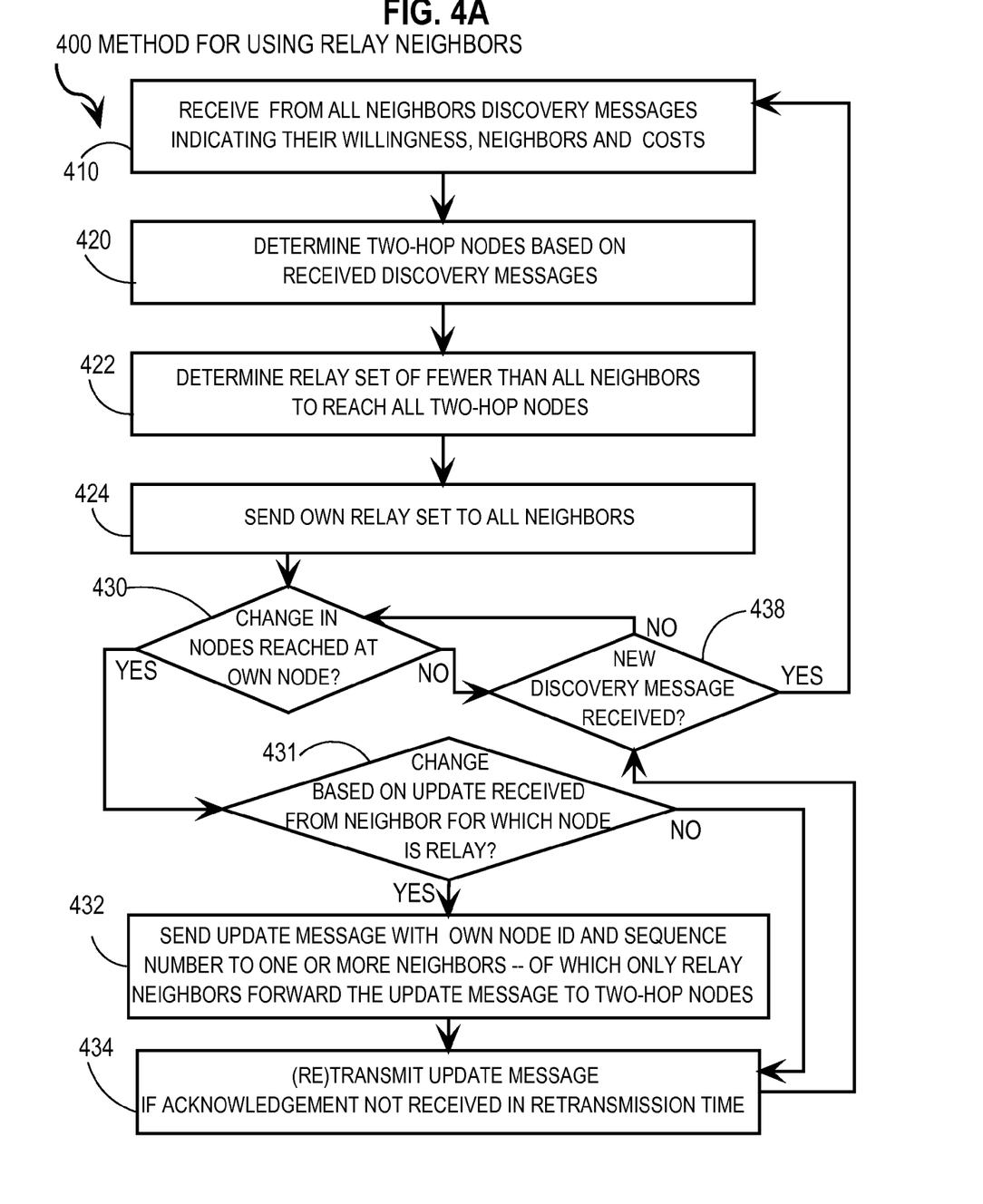
FIG. 4A illustrates, at a high level, an example method for using relay neighbors in a two-hop relay process, according to an embodiment.
Figure 4B:
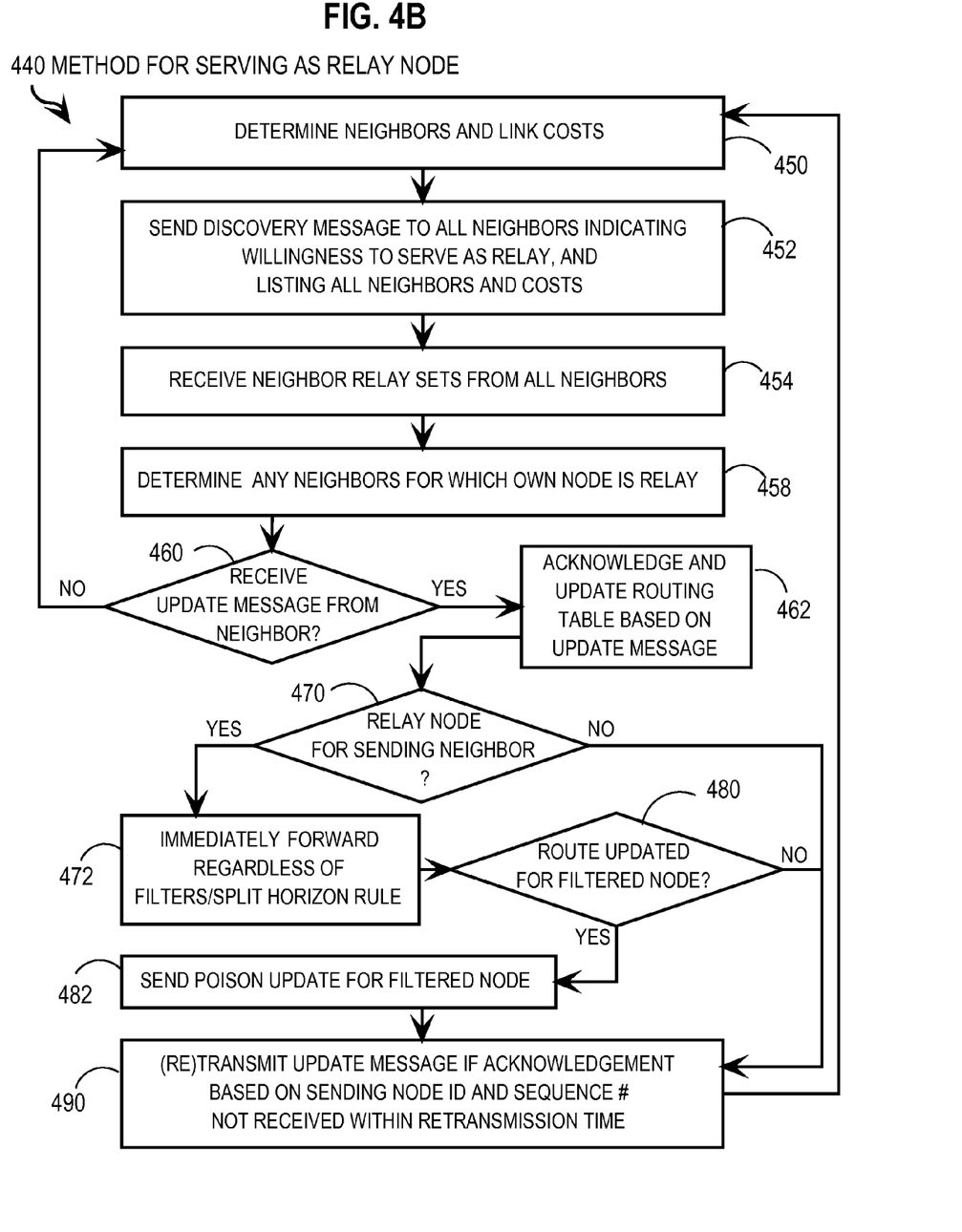
FIG. 4B illustrates, at a high level, an example method for serving as a relay neighbor in a two-hop relay process, according to an embodiment.

FIG. 4A illustrates, at a high level, an example method 400 for using relay neighbors in a two-hop relay process, according to an embodiment. Although steps in FIG. 4A and subsequent flow chart, FIG. 4B, are show in a particular order for purposes of illustration, in various other embodiments, one or more steps are performed in a different order or overlapping in time, in series or in parallel, or one or more steps are omitted or added, or changed in some combination of ways.

In step 410, distance vector neighbor discovery messages are received from all neighbors. The neighbor discovery messages include data that indicates the sending node's neighbors, at least, e.g., in neighbor field 314. In the illustrated embodiment, the discovery messages of the type indicated by message 310 are received with cost field 317 and relay willingness field 318 both included. For example, in network 100, node 120a receives messages 310 from all its neighbors: node 120b, node 120c, node 120d and node 120g. For purposes of illustration, it is assumed that the data received during step 410 indicates the values listed in Table 1. In other embodiments, other messages with this information, such as special update type messages, are received. In the illustrated embodiment, the information listed in Table 1 is stored in neighbors' neighbors field 232 at node 120a.

TABLE 1

Example neighbors, costs and willingness received in discovery messages at node 120a.

| Sending node | Relay Willingness | Neighbors | Costs |
|---|---|---|---|
| 120b | 128 | 120a, <u>120e</u>, <u>120f</u> | 32, 30, 40 |
| 120c | 140 | 120a, 120e | 31, 31 |
| 120d | 160 | 120a, 120e | 33, 50 |
| 120g | 128 | 120a | 38 |

In step 420, two-hop nodes are determined based on the received messages with neighbor data, such as the discovery messages 310. For example, in network 100, node 120a determines based on the data in Table 1 that its two-hop nodes are node 120e and node 120f, underlined upon their first appearance in Table 1. In the illustrated embodiment, the two-hop data is stored in two-hop data field 240.

In step 422, a relay set of possibly fewer than all neighbors is determined. The relay set is able to forward updates to all two-hop nodes from the node receiving the messages with neighbors data. The relay set is determined based on the messages received from the neighbors. In an illustrated embodiment, the relay data set is stored locally in relay data field 244.

For example, it is determined in step 422 that neighbor 120b should be in the relay set alone. Node 120b is able to forward to both two-hop nodes 120e and 120f, and no other node is needed to reach all of nodes that are two hops from node 120a.

In some embodiments, the determination made during step 422 includes consideration of the cost or the willingness or both. For example, if node 120f leaves the network 100, then there is only one two-hop node from node 120a, i.e., node 120e. Three neighbors (node 120b, node 120c, node 120d) are able to send updates to node 120e. The one chosen as the relay node is determined in step 422 based on the cost or willingness or both. For example, in some embodiments, cost is given more weight, and among neighbors with equal cost, willingness is used, and router ID number is then used to break remaining ties. In such an embodiment, both node 120b and node 120c have lower cost (62) than node 120d (83), so one of those two is chosen. Node 120c has higher willingness, so node 120c is chosen as the only neighbor in the relay set. If cost is only used to break ties in willingness, then node 120d, with the highest willingness is chosen as the only neighbor in the relay set.

In some embodiments, both cost and willingness are used together. For example, the neighbor is chosen with a highest score given by subtracting a weighted cost from willingness. For a weight of 1.0, and node 120f absent, the scores of the three neighbors, node 120b, node 120c and node 120d are 66, 78 and 77, respectively. Node 120c with the highest score, 78, is chosen to be the only node in the relay set.

In step 424, the relay set for the node is sent to all the neighbors. For example, a neighbor discovery message 320 is sent to all neighbors with the relay set indicated by data in the relay information field 326. In the illustrated embodiment, using discovery message 320, the relay information field 326 holds data that indicates the relay set made up of node 120b alone. If a relay set has already been sent to all neighbors and neither the neighbors nor the relay set has changed, then step 434 is omitted.

In step 430, it is determined whether there is a change in nodes reached from the current node, as is usual for a distance vector routing protocol. If not, control passes to step 438. In step 438, it is determined whether there is a new neighbor discovery message received. If so, control passes back to step 410 and subsequent steps to adapt to any changes in neighbors based on the new neighbor discovery messages. If not, control passes through other steps, not shown, back to step 430.

If it is determined in step 430 that there is a change in nodes or addresses reached from the current node, then control passes to step 431. For example, if another LAN with a new range of IP addresses is connected to node 120a, then control passes to step 431.

In step 431, it is determined whether the change is based on an update from a neighbor for which the current node is not a relay. If so, then an update is not produced by the current node and control shifts to step 434 described below. Otherwise, control passes to step 432 in which the current node sends an update message based on the local changes. For example, since node 120a is a relay node for all its neighbors, node 120a always sends an update. However, if it is assumed for purposes of illustration that node 120c is not a relay node for node 120a, then an update received at node 120c from node 120a is used to update the routing tables at node 120c, but the change is not included in an update sent from node 120c, e.g., to node 120e.

In step 432, an update message is sent to one or more neighbors. Unlike extant distance vector routing protocol update messages, the update message includes an identifier for the sending node (e.g., in field 346 of message 330) and a sequence #, such as a time stamp, that is unique among all update messages sent by the sending node (e.g., in field 348). In the illustrated embodiment, the update message due to changes at the local node is sent to all neighbors.

As explained in more detail below, each neighbor that receives the update message sent in step 432 sends an acknowledgement message and uses the data to update their own routing tables. However, rather than generating an update message to send to their neighbors, as is the case in extant distance vector routing protocols, only the relay nodes for the sending node forward the change in information, as an unchanged update message for changes that originated in their neighbor or as a modified update for changes that originated elsewhere. The nodes that are not relay nodes for the sending node do not send any updates, because such updates are rendered redundant by the information already sent in discovery messages and forwarded by the relay node(s), or information in updates sent by relay nodes. In the illustrated embodiment, node 120b forwards the update message, unchanged, from node 120a. Node 120b incorporates updates received through node 120a from farther nodes, e.g., node 120g, and sends a modified update message. Nodes 120c incoprorte changes received through node 120a, but do not send updates, since they are not relay nodes for node 120a. The update message forwarded or generated by node 120b is received by node 120e and node 120f, which use the information to update their routing tables. In this embodiment, the node (e.g., node 120a) reduces the number of directly connected neighbors which forward updates based on the sending node's knowledge of the two hop neighborhood.

In step 434, the update message generated locally is retransmitted from node 120a if an acknowledgement is not received from all its neighbors within a predetermined retransmission time. Also, the update message received from the neighbor for which the current node is not a relay node (e.g., received at node 120c from node 120a) is transmitted from the node if an acknowledgement is not received from all its neighbors within a predetermined retransmission time. Control then passes back to step 438 and following steps to respond to new discovery messages and update messages.

FIG. 4B illustrates, at a high level, an example method 440 for serving as a relay neighbor in a two-hop relay process, according to an embodiment.

In step 450, the neighbors and link costs to those neighbors are determined, e.g., based on neighbor discovery messages and acknowledgements, as is currently done in distance vector routing protocols. For example, node 120b determines the neighbors and link costs listed in two columns of the first line of Table 1, above.

In step 452, a discovery message is sent to all neighbors optionally indicating willingness to serve as relay and listing all neighbors and, optionally, costs. In the illustrated embodiment, the discovery messages of the type indicated by message 310 are sent with cost field 317 and relay willingness field 318 both included. For example, in network 100, node 120b sends message 310 to all its neighbors, including node 120a, as listed in the first line of Table 1. In other embodiments, other messages with this information, such as special update type messages, are sent.

In step 454, a message is received from each neighbor indicating that neighbor's relay set. For example, a neighbor discovery message 320 is received from all three neighbors of node 120b with the relay set indicated by data in the relay information field 326. In the illustrated embodiment, a discovery message 320 is received from node 120a in which the relay information field 326 holds data that indicates the relay set made up of node 120*b* alone. Similarly, a discovery message 320 is received from node 120*f* in which the relay information field 326 holds data that indicates the relay set made up of node 120*b* alone. For purposes of illustration, it is assumed that node 120*e* selects node 120*c* as its relay node to update its two-hop node, node 120*a*. Thus, a discovery message 320 is received from node 120*e* in which the relay information field 326 holds data that indicates the relay set made up of node 120*c* alone.

In step 458, the node receiving the relay sets determines neighbors, if any, for which the receiving node is a relay node. In the illustrated embodiment, the neighbors for which the receiving node serves as a relay node are stored in self relay field 260. Thus, at node 120*b*, the self relay field 260 holds data that indicates node 120*b* is a relay node for two neighbors, node 120*a* and node 120*f*.

In step 460, it is determined whether the node receives an update message from a neighbor, as is currently done in most distance vector routing protocols. If not, control passes back to step 450 and subsequent steps to receive any updates in neighbors and relay sets. If it is determined in step 460 that the node receives an update message from a neighbor, then control passes to step 462. It is assumed for purposes of illustration that node 120*b* receives an update message sent by node 120*a* that indicates the IP addresses of the LAN just connected to node 120*a*. Unlike extant distance vector routing protocol update messages, the update message includes an identifier for the sending node (e.g., in field 346 of message 330) and a sequence #, such as a time stamp, that is unique among all update messages sent by the sending node (e.g., in field 348).

In step 462, the receiving node acknowledges the update message, e.g., by sending a short message that indicates the node identifier for the sending node. The receiving node also uses the data to update its routing table, and stores the update message for retransmission if not acknowledged. Control then passes to step 470.

In step 470, it is determined whether the node that receives the update message is a relay node for the sending node. For example, in some embodiments, the node checks the contents of self relay field 260 to determine whether data indicating the sending node is included therein. If so, then control passes to step 470. If not, then control passes to step 490.

In the illustrated embodiment, node 120*b* that received the update message from 120*a* determines that the sending node, node 120*a*, is included in the self relay field 260. Therefore node 120*b* recognizes that it is a relay node for the update message from node 120*a* and control passes to step 472.

In step 472 the update message is immediately forwarded to all neighbors of the relay node, regardless of split horizon or filtering rules. In the illustrated embodiment, the update message from node 120*a* is sent unchanged to node 120*e* and node 120*f*, the neighbors of relay node 120*b* for the sending node 120*a*. This is done even if the update is for IP addresses that are listed in a filter for node 120*b*.

When node 120*e* receives this update, it learns that node 120*a* can reach the new LAN addresses. Node 120*b* can determine whether the best route to node 120*a* and the LAN addresses is through the relay node 120*b* or another node, e.g., node 120*c* or node 120*d*. Node 120*e* can make this determination because node 120*e* already received costs to reach node 120*a* through node 120*b* and node 120*c* and node 120*d* in the discovery messages sent by each node when step 452 was executed at that node. For example, node 120*e* received the discovery messages listed in the first three lines of Table 1. Thus when node 120*e* updates its routing table it knows that the new addresses reached at node 120*a*, which sent the forwarded message, has the same cost (62) through node 120*b* and node 120*c* Node 120*e* will chose one of these two nodes to forward data packets directed to the new LAN addresses.

At node 120*c* and node 120*d*, which are not relay nodes for node 120*a*, the routing tables are updated in step 462. However, it is determined in step 470 that the node receiving the update message is not the relay node for the sending node. Control passes to step 490 instead of step 472. The update message is not forwarded and updates to costs at nodes 120*c* and 120*d* are not used to generate new update messages from those nodes.

After step 472, in the illustrated embodiment, control passes to step 480. In step 480 it is determined whether the update message indicates a filtered node is updated. For example, it is determined whether the new LAN addresses are listed as filtered addresses at node 120*b*.

A node is configured with filter data indicting node addresses for which the node will not forward data packets. Any method may be used to receive this configuration data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods.

If it is determined in step 480 that the route destinations updated in the update message are not filtered node addresses, control also passes to step 490. However, if it is determined that one or more route destinations updated in the update message are filtered node addresses, then control passes to step 482.

In step 482 a poison update message is sent to all neighbors for the filtered node addresses. A poison update message indicates a prohibitive cost to reach the filtered node through the node that sends the update message. For example, node 120*b* sends a poison update message that indicates a cost to reach a filtered node address is a value that indicates "infinite" cost. Control then passes to step 490.

In step 490, any node that received an update message, whether a relay node or not, retransmits the update message if an acknowledgement for the update message is not received within a retransmission time. Because the update did not originate with the node that does the retransmission, the acknowledgement is recognized using the originating node identifier and sequence #. Control then passes back to step 450 to detect changes in neighbors or new update messages.

Neither relay nodes nor other neighbors of node 120*a* construct a new update message based on changes to their routing table. Such updates are redundant with the information already passed in the forwarded update and the discovery messages reporting neighbors and costs. Thus the bandwidth to send updates from node 120*c* and node 120*d* is conserved for other uses. The bandwidth consumed for passing distance vector routing protocol information is reduced.

Method 400 or method 440 or both constitute the two-hop relay process 150 depicted in FIG. 1 that is included on one or more nodes of a network.

5.0 Implementation Mechanisms—Hardware Overview

Figure 5:
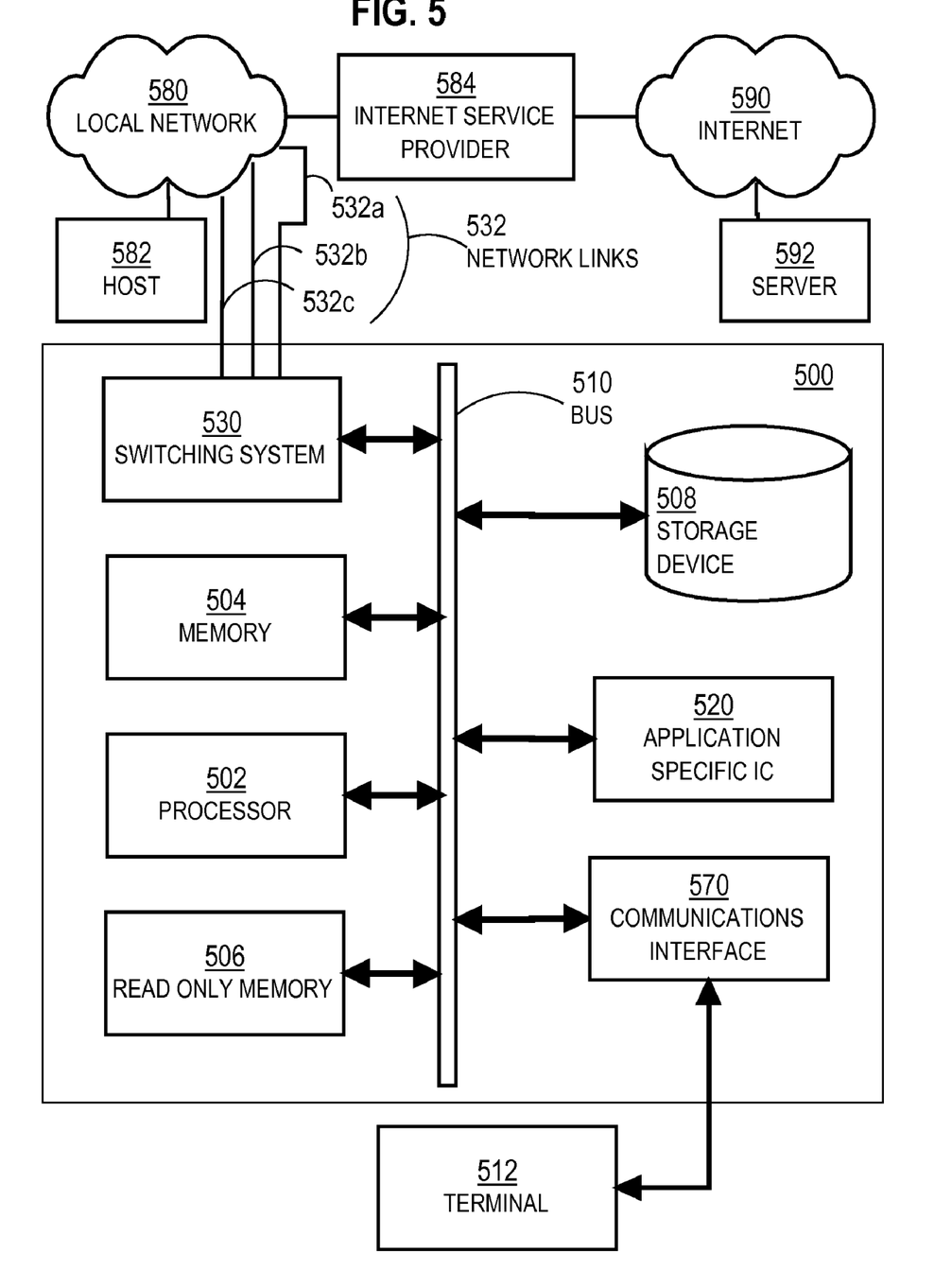
FIG. 5 illustrates a computer system upon which an embodiment of the invention may be implemented.

FIG. 5 illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made variations in amplitude, frequency, phase, polarization or other physical properties of carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling via transmission media to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented using carrier waves. For wireless links, the communications interface 570 sends and receives electrical, acoustic or electromagnetic signals, including infrared and optical signals, which carry information streams, such as digital data.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments, an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication via transmission media through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software, unless otherwise explicitly stated.

The signals transmitted over network link 532 and other networks via transmission media through communications interfaces such as interface 570, carry information to and from computer system 500. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
receiving, at a node in a communications network, an update message for a distance vector routing protocol from a first neighbor of a plurality of neighbors, wherein the update message indicates a destination in the communications network and a least total cost of reaching that destination from the first neighbor, wherein the node is configured to filter at least one change in cost for a selected network address such that it is not forwarded;
sending, to a different neighbor of the plurality of neighbors, the update message, wherein if the change in cost for the selected network address is for a sole address provided in the update message, then the update message is not forwarded by the node;
sending the update message to the different neighbor of the plurality of neighbors if the node is a relay node for the first neighbor, wherein the relay node is a node preferred by the first neighbor to update a particular node a certain number of hops from the first neighbor;
determining whether the update message is for a filtered node address; and
sending to the different neighbor a poison update message that indicates a prohibitive cost to reach the filtered node address through the node.

2. The method as recited in claim 1, wherein sending the update message to the different neighbor further comprises sending the update message as a multicast to the plurality of neighbors.

3. The method as recited in claim 1, wherein determining whether the node is the relay node for the first neighbor further comprises:
receiving from the first neighbor a first message for the distance vector routing protocol, wherein the first message includes relay identification data that indicates the relay node; and,
determining that the node is the relay node if the relay identification data indicates the node.

4. The method as recited in claim 3 wherein the first message is a type of neighbor discovery message for the distance vector routing protocol.

5. The method as recited in claim 3 further comprising, sending a different second message for the distance vector routing protocol to the plurality of neighbors, wherein the different message includes neighbor data that indicates the plurality of neighbors.

6. The method as recited in claim 5 wherein the relay identification data is based on the neighbor data.

7. The method as recited in claim 5 wherein the neighbor data also indicates a corresponding plurality of costs to reach the plurality of neighbors and the relay identification data is also based on the plurality of costs.

8. The method as recited in claim 5 wherein:
the second message includes willingness data that indicates a relative capacity of the node to serve as a relay node; and,
the relay identification data is also based on the willingness data.

9. The method as recited in claim 5 wherein the second message is a type of neighbor discovery message for the distance vector routing protocol.

10. The method as recited in claim 1, further comprising:
if it is determined that the node is not the relay node for the first neighbor, then,
determining whether an acknowledgment message is received for the update message within a retransmission time; and
only sending the update message to the plurality of neighbors if it is determined that the acknowledgment message is not received within the retransmission time.

11. The method as recited in claim 1, further comprising, if it is determined that the node is not the relay node for the first neighbor, then, updating the local routing information based on the update message without sending an update message reflecting the updates to the local routing information.

12. A method comprising:
receiving, at a first node in a communications network, a first message for a distance vector routing protocol from each neighbor of a plurality of neighbors, wherein the first message from each neighbor of the plurality of neighbors includes a neighbor data that indicates a set of one or more nodes that are in direct communication with the neighbor;
determining a relay set of fewer than all neighbors of the plurality of neighbors based on the neighbor data received from every neighbor of the plurality of neighbors, wherein the first node is configured to filter at least one change in cost associated with reaching a destination for a selected network address such that it is not forwarded; and
sending to the plurality of neighbors a second message for the distance vector routing protocol, wherein the second message includes relay data that indicates the relay set, wherein every node two hops from the first node is updated using the relay set of neighbors;
determining whether a particular message is for a filtered node address; and
sending to a particular neighbor a poison update message that indicates a prohibitive cost to reach the filtered node address through the first node.

13. The method as recited in claim 12, wherein at least one of the first message or the second message is a type of neighbor discovery message for the distance vector routing protocol.

14. The method as recited in claim 12, wherein the neighbor data also indicates a cost of reaching each node in the set of one or more nodes from the neighbor and determining a relay set is also based on the plurality of costs.

15. The method as recited in claim 12, wherein:
the first message from each neighbor of the plurality of neighbors includes willingness data that indicates a relative capacity of the neighbor to serve as a relay node; and
determining the relay set further comprises determining the relay set based on the willingness data.

16. An apparatus comprising:
a network interface that is part of a node and that is configured for communicating a data packet with a packet-switched network;
logic encoded in one or more tangible media for execution and, when executed, operable to:
receive an update message for a distance vector routing protocol from a first neighbor of a plurality of neighbors, wherein the update message indicates a destination in a communications network and a least total cost of reaching that destination from the first neighbor, wherein the node is configured to filter at least one change in cost for a selected network address such that it is not forwarded as part of the update message;
send, to a different neighbor of the plurality of neighbors, the update message, wherein if the change in cost for the selected network address is for a sole address provided in the update message, then the update message is not forwarded by the node;
send the update message to the different neighbor of the plurality of neighbors if the node is a relay node for the first neighbor, wherein the relay node is a node preferred by the first neighbor to update a particular node two hops from the first neighbor;
determine whether the update message is for a filtered node address; and
send to the different neighbor a poison update message that indicates a prohibitive cost to reach the filtered node address.

17. The apparatus as recited in claim 16, wherein the logic operable to determine whether the apparatus is the relay node for the first neighbor is further operable to:
receive from the first neighbor a first message for the distance vector routing protocol, wherein the first message includes relay identification data that indicates the relay node; and,
determine that the apparatus is the relay node if the relay identification data indicates the apparatus.

18. The apparatus as recited in claim 17 wherein the first message is a type of neighbor discovery message for the distance vector routing protocol.

19. The apparatus as recited in claim 17 wherein the logic, when executed, is further operable to send a different second message for the distance vector routing protocol to the plurality of neighbors, wherein the different message includes neighbor data that indicates the plurality of neighbors.

20. The apparatus as recited in claim 19 wherein the relay identification data is based on the neighbor data.

21. The apparatus as recited in claim 19 wherein the second message is a type of neighbor discovery message for the distance vector routing protocol.

22. The apparatus as recited in claim 16, wherein, if it is determined that the apparatus is not the relay node for the first neighbor, the logic is further operable to then, determine whether an acknowledgment message is received for the update message within a retransmission time; and only send the update message to the plurality of neighbors if it is determined that the acknowledgment message is not received within the retransmission time.

\* \* \* \* \*